(12) United States Patent
Bright

(10) Patent No.: US 6,935,670 B2
(45) Date of Patent: Aug. 30, 2005

(54) INTEGRATED TRUCK BOX AND REMOVABLE INSERT

(76) Inventor: Verona Lynn Bright, 33662 51st Rd., Arkansas City, KS (US) 67005

( * ) Notice: Subject to any disclaimer, the term of this patent is extended or adjusted under 35 U.S.C. 154(b) by 23 days.

(21) Appl. No.: 10/697,062

(22) Filed: Oct. 30, 2003

(65) Prior Publication Data

US 2005/0095077 A1    May 5, 2005

(51) Int. Cl.[7] ................................................ B60R 9/00
(52) U.S. Cl. .................... 296/37.6; 410/23; 410/30; 224/404; 312/324
(58) Field of Search .................... 296/37.6; 410/7, 410/23, 30; 224/402–404, 542, 546, 42.13, 224/42.32; 220/23.4, 826, 23.83; 312/324, 312/902

(56) References Cited

U.S. PATENT DOCUMENTS

| 3,727,971 | A | * | 4/1973 | Sisler ........................ 296/37.6 |
| 4,288,011 | A | | 9/1981 | Grossman |
| 4,437,597 | A | | 3/1984 | Doyle |
| 4,488,669 | A | | 12/1984 | Waters |
| 4,770,330 | A | * | 9/1988 | Bonstead et al. ........... 224/404 |
| 4,921,152 | A | | 5/1990 | Kemming |
| 5,439,150 | A | * | 8/1995 | Trahms ...................... 224/404 |
| 5,853,116 | A | * | 12/1998 | Schreiner .................... 224/404 |
| 5,988,473 | A | * | 11/1999 | Hagan et al. ................ 224/404 |
| 6,065,914 | A | * | 5/2000 | Fotou .............................. 410/3 |
| 6,331,094 | B1 | * | 12/2001 | Burrows ....................... 410/30 |
| 6,761,519 | B2 | * | 7/2004 | Alderman ....................... 410/3 |

* cited by examiner

*Primary Examiner*—Stephen Gordon
(74) *Attorney, Agent, or Firm*—Shook Hardy & Bacon

(57) ABSTRACT

The present invention provides an integrated truck box and removable insert for positioning within a truck bed. The integrated truck box and removable insert includes first and second truck box body sections and a removable insert. Each truck box body section may have a lid enclosing an interior of the respective body section into which items may be placed. The truck box body sections are also disposed adjacent to one another to define a cavity therebetween into which the removable insert may be positioned. At least one of the lids of the first and second truck box body sections overlaps a portion of the cavity such that when the removable insert is positioned with the cavity, the insert and at least one of said first and second truck box body sections having the at least one overlapping lid form an interference with one another to inhibit removal of the insert from the cavity.

13 Claims, 3 Drawing Sheets

INTEGRATED TRUCK BOX AND REMOVABLE INSERT

CROSS REFERENCE TO RELATED APPLICATIONS

None

FEDERALLY SPONSORED RESEARCH

There is no Federally sponsored research associated with this application.

REFERENCE TO SEQUENCE LISTING

None

FIELD OF THE INVENTION

The present invention relates generally to truck boxes and, more particularly, to the combination of a truck box and an insert removably positioned therewith.

BACKGROUND OF THE INVENTION

The truck box with integrated motorcycle support and tie down is a marked safety improvement and more efficient means over transporting a motorcycle in the back of a truck with a truck box that has no integrated motorcycle support or tie down. It does however somewhat limit the available space of the box as a portion of the box is utilized solely for the integrated motorcycle support. This lost space can be regained, and even enhanced, through the use of the present invention, a removable insert for the truck box with integrated motorcycle support and tie down.

It is therefore an object of this invention to provide a removable insert for the truck box with integrated motorcycle support and tie down to increase the flexibility and usefulness of the truck box with integrated motorcycle support and tie down by having inserts configured for use in wheel retainment and support, storage cabinets, ice chests, equipment holders, sporting goods or tool holders, or any other variety of holders, retainers or containers found useful.

It is another object of this invention to provide a removable insert for the truck box with integrated motorcycle support and tie down that can not only be transported safely in the bed of a truck as a part of the truck box with integrated motorcycle support and tie down, but can easily be removed for continual transportation by other means without the need to unpack the items contained within the removable insert.

It is yet another object of this invention to provide a removable insert for a truck box with integrated motorcycle support and tie down to ease in cleaning of both the box and the removable insert.

BRIEF SUMMARY OF THE INVENTION

In accordance with the present invention, there is a need to increase the flexibility of use of the truck box with integrated motorcycle support and tie down through the use of the removable insert.

By reconfiguring the truck box with integrated motorcycle support and tie down from that of an integrated motorcycle support to that of a cavity for a removable insert, we can not only regain the space and usefulness of the box, we can also greatly increase the flexibility of the truck box with integrated motorcycle support and tie down by providing an unlimited number of different inserts configured to assist and help in all ways.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DETAILED DESCRIPTION

Figure 1:
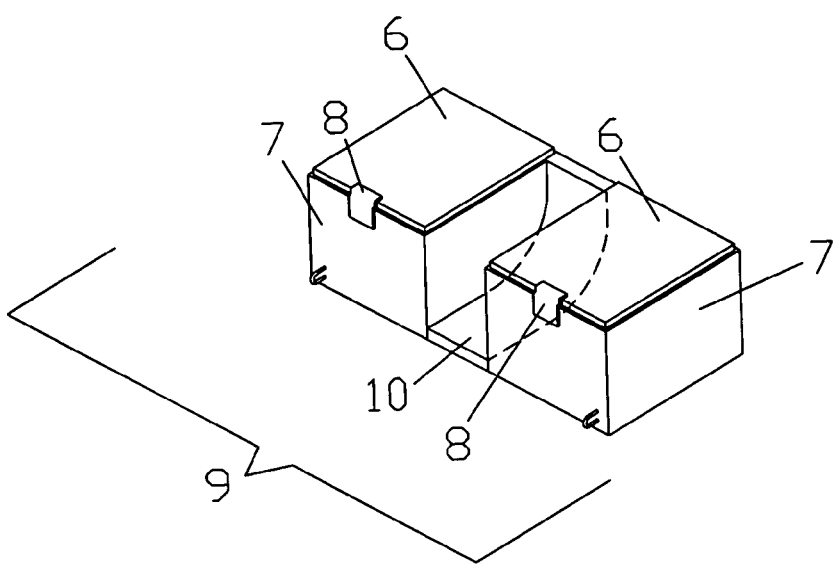
FIG. 1 is a perspective view of a prior design for a truck box with integrated motorcycle support and tie down.

FIG. 1 is a perspective view of the truck box with integrated motorcycle support and tie down 9 showing the main components of the lid 6, the box body 7, the box lid latch 8 and the integrated motorcycle support 10.

Figure 2:
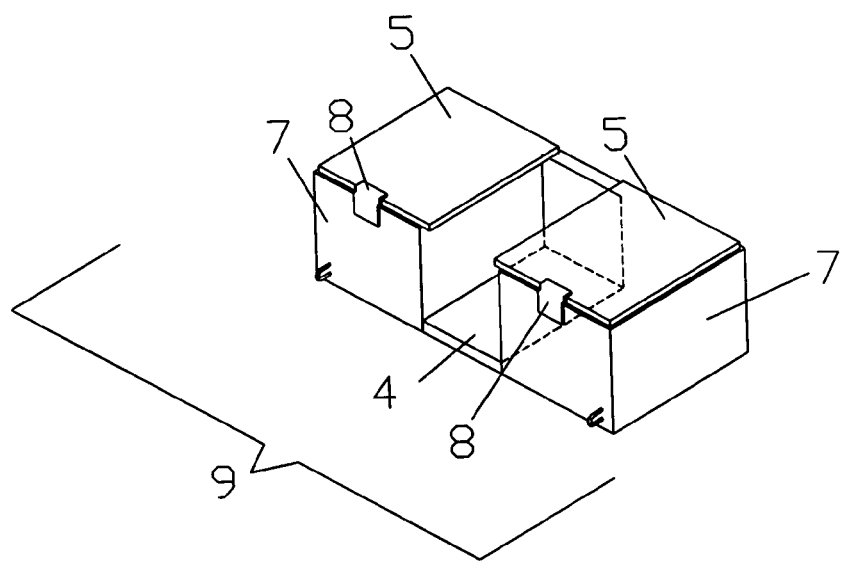
FIG. 2 is a perspective view of a truck box with integrated motorcycle support and tie down show the integrated motorcycle support are reconfigured as a cavity for a removable insert.

FIG. 2 is a perspective view of the truck box with integrated motorcycle support and tie down 9 showing the reconfigured lid 5, the integrated motorcycle support 10 reconfigured into that of the cavity for removable insert 4.

Figure 3:
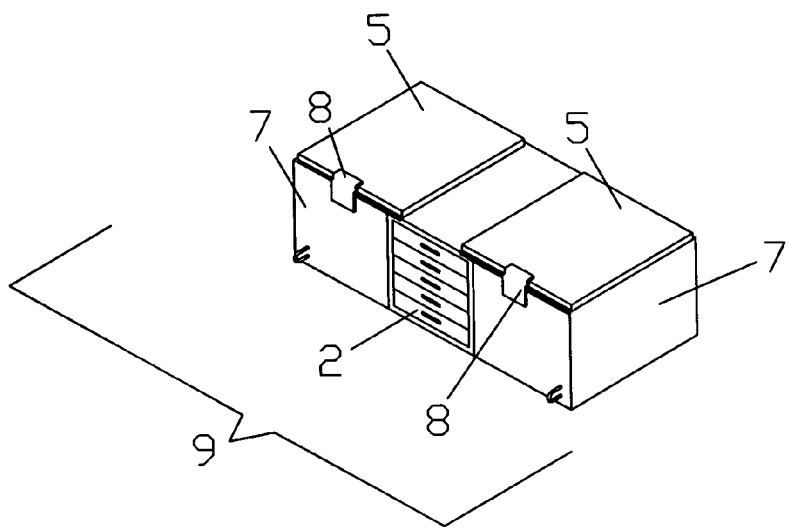
FIG. 3 is a perspective view of the truck box with integrated motorcycle support and tie down, shown with a removable insert configured as a storage cabinet with drawers.

FIG. 3 is a perspective view of the truck box with integrated motorcycle support and tie down 9, shown with a storage cabinet with drawers removable insert 2. It should be noted the storage cabinet with drawers removable insert 2 is secured firmly in place by the reconfigured lid 5 and locked in place by the box lid latch 8. It should also be noted the orientation of the storage cabinet with drawers removable insert 2 is shown to more easily display the drawers for illustrative purposes. The actual orientation may be in 90 degree increments to that shown to retain the drawers shut within the removable insert cavity 4.

Figure 4:
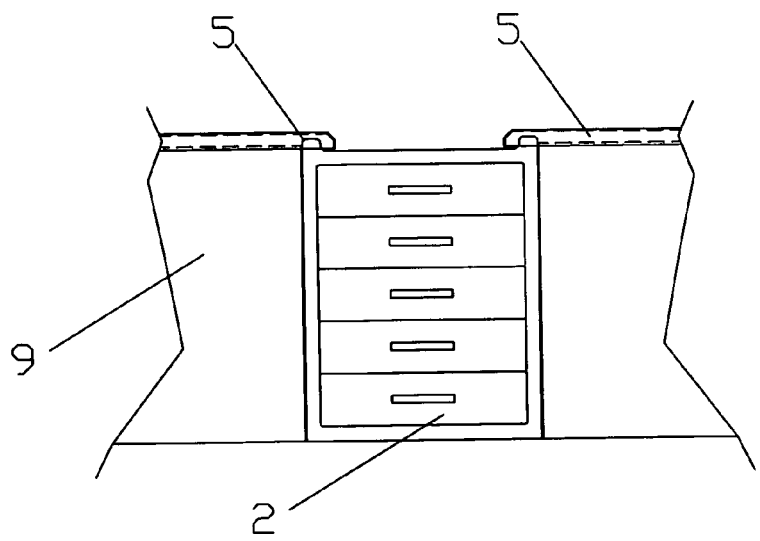
FIG. 4 is a partial cross sectional front view of the truck box with integrated support and tie down, showing the removable insert configured as a storage cabinet with drawers being retained in the cavity for removable insert by the reconfigured lid.

FIG. 4 is a cross sectional view of the truck box with integrated motorcycle support and tie down 9, showing the storage cabinet with drawers removable insert 2 being retained in the cavity for removable insert 4 by the reconfigured lid 5.

Figure 5:
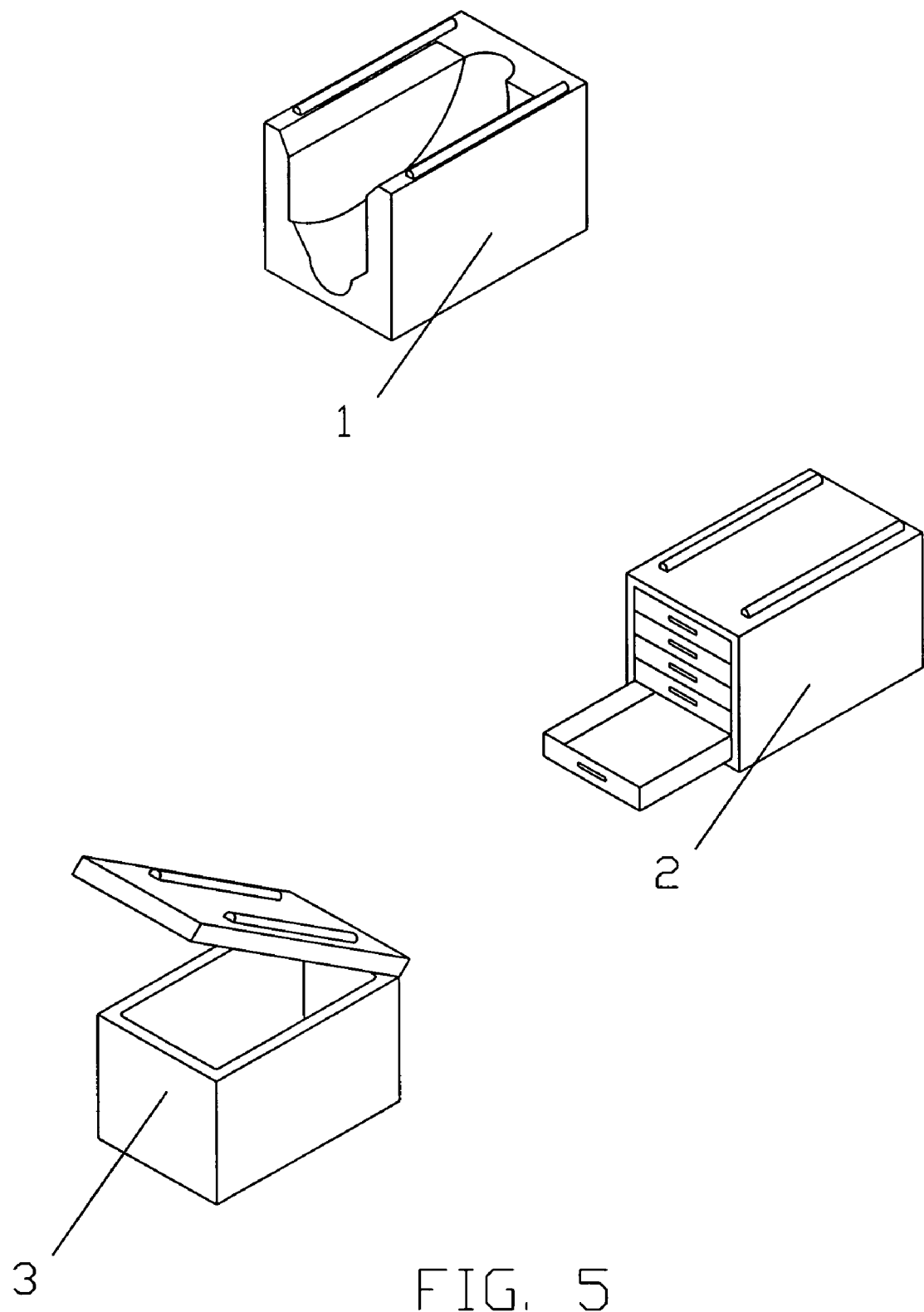
FIG. 5 shows perspective views of various embodiments of the removable insert.

FIG. 5 is a perspective view of various forms that the removable insert may have. A few examples are the wheel support removable insert 1, the storage cabinet with drawers removable insert 2 and the ice chest removable insert 3. Other examples are a fishing pole holder removable insert, a portable grill removable insert or a fire extinguisher holder removable insert. These examples of removable inserts are for illustrative purposes only and are not intended to be a complete list of removable inserts.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. An integrated truck box and removable insert for positioning within a truck bed, comprising:

first and second truck box body sections each having a lid enclosing an interior into which items may be placed, the body sections disposed adjacent to one another to define a cavity therebetween; and a removable insert having a width greater than a lateral distance between the lids of the first and second truck box body sections, the removable insert being configured for positioning within the cavity;

wherein the lids of the first and second truck box body sections overhang the cavity, each lid being releasably engageable with the respective body section to lock the position of the lid relative to the body section and prohibit the removable insert from moving upwardly out of the cavity.

2. The integrated truck box and removable insert of claim 1, wherein each lid is releasably engagable with the respective body section by a latch.

3. The integrated truck box and removable insert of claim 1, further comprising a frame interconnecting the first and second truck box body sections such that the removable insert may be positioned on the frame between the body sections.

4. An integrated truck box and removable insert for positioning within a truck bed, comprising:

first and second truck box body sections each having a lid enclosing an interior into which items may be placed, each lid having a top surface and a bottom surface, and the body sections being disposed adjacent to one another to define a cavity therebetween; and a removable insert having a top surface and being configured for positioning within the cavity;

wherein each lid has at least one recess formed in the bottom surface thereof for receiving a raised member formed on the top surface of the removable insert to secure the insert in position in the cavity.

5. The integrated truck box and removable insert of claim 1, further comprising tie downs extending from the first and second truck box body sections.

6. The integrated truck box and removable insert of claim 1, wherein the cavity opens up in vertical and horizontal directions.

7. An integrated truck box and removable insert for positioning within a truck bed, comprising:

first and second truck box body sections each having a lid enclosing an interior into which items may be placed, the body sections being disposed adjacent to one another to define a cavity therebetween, and at least one of the lids positioned to overlap a portion of the cavity; and a removable insert configured for positioning within the cavity;

wherein the removable insert and at least one of said first and second truck box body sections having the lid positioned to overlap a portion of the cavity form an interference with one another when the removable insert is positioned within the cavity to inhibit removal of the removable insert from the cavity.

8. The integrated truck box and removable insert of claim 7, wherein said at least one lid positioned to overlap a portion of the cavity is releasably engageable with the respective body section to lock the position of the lid relative to the body section, the removable insert and said at least one overlapping releasably engageable lid each having a surface, and wherein a recess is formed in said surface of one of said removable insert and said at least one overlapping releasably engageable lid and a raised member is formed in said surface of the other one of said removable insert and said at least one overlapping releasably engageable lid, the recess being configured to accept the raised member therein to lock the removable insert in the cavity when said at least one overlapping releasably engageable lid is locked in position relative to the body section.

9. The integrated truck box and removable insert of claim 1, wherein at least one of the lids includes a recess and the insert includes at least one raised member configured to fit within each recess when the at least one of the lids abuts the insert such that upon locking the position of the lids relative to the respective body sections, the insert is further prohibited from moving horizontally out of the cavity.

10. The integrated truck box and removable insert of claim 8, wherein the recess is formed on the surface of said at least one overlapping releasably engageable lid and the raised member is formed on the surface of said removable insert.

11. The integrated truck box and removable insert of claim 7, wherein the removable insert is a wheel support insert having an arcuate channel into which a wheel may be positioned.

12. The integrated truck box and removable insert of claim 7, wherein the removable insert is a storage cabinet with a set of drawers.

13. The integrated truck box and removable insert of claim 7, wherein the removable insert is an ice chest.

* * * * *